US012728893B2

(12) United States Patent
Han

(10) Patent No.: US 12,728,893 B2
(45) Date of Patent: Sep. 8, 2026

(54) APPARATUS FOR DRIVER ASSISTANCE AND METHOD OF CONTROLLING THE SAME

(71) Applicant: HL Klemove Corp., Incheon (KR)

(72) Inventor: Sangyoon Han, Gunpo-si (KR)

(73) Assignee: HL Klemove Corp., Incheon (KR)

( * ) Notice: Subject to any disclaimer, the term of this patent is extended or adjusted under 35 U.S.C. 154(b) by 201 days.

(21) Appl. No.: 18/218,760

(22) Filed: Jul. 6, 2023

(65) Prior Publication Data

US 2024/0010231 A1 Jan. 11, 2024

(30) Foreign Application Priority Data

Jul. 6, 2022 (KR) ........................ 10-2022-0082888

(51) Int. Cl.
*B60W 60/00* (2020.01)
*B60W 10/18* (2012.01)
(Continued)

(52) U.S. Cl.
CPC ........ *B60W 60/0011* (2020.02); *B60W 10/18* (2013.01); *B60W 10/20* (2013.01);
(Continued)

(58) Field of Classification Search
CPC ................. B60W 10/18; B60W 10/20; B60W 2420/403; B60W 2420/408; B60W 2420/54; B60W 2552/10; B60W 2554/402; B60W 2554/4041; B60W 2554/4042; B60W 2554/802; B60W 2556/40;
(Continued)

(56) References Cited

U.S. PATENT DOCUMENTS 6,087,961 A * 7/2000 Markow .............. G08G 1/0965 340/902
10,008,111 B1 * 6/2018 Grant ..................... G08G 1/166
(Continued)

FOREIGN PATENT DOCUMENTS

CN 114973710 A * 8/2022 ........... G08G 1/0965
DE 102011102024 A1 * 4/2012 ............ G08G 1/087
(Continued)

OTHER PUBLICATIONS

KR OA dated Apr. 18, 2024.

*Primary Examiner* — Babar Sarwar
(74) *Attorney, Agent, or Firm* — Harvest IP Law, LLP

(57) ABSTRACT

Disclosed herein is an apparatus for changing a traveling lane based on road situations during autonomous driving. The apparatus for driver assistance provided in a vehicle includes a camera module, a radar module, and a processor configured to determine whether a traveling route of the vehicle needs to be changed based on received traveling route information of an emergency vehicle and traveling route information of the vehicle upon receiving the traveling route information of the emergency vehicle through a communicator of the vehicle during autonomous driving, and control the autonomous driving along a traveling route changed based on at least one of output data of the camera module or output data of the radar module when it is determined that the traveling route of the vehicle needs to be changed.

16 Claims, 8 Drawing Sheets

141

(51) Int. Cl.
*B60W 10/20* (2006.01)
*B60W 30/18* (2012.01)
*G06V 20/58* (2022.01)

(52) U.S. Cl.
CPC . *B60W 30/18163* (2013.01); *B60W 2420/403* (2013.01); *B60W 2420/408* (2024.01); *B60W 2420/54* (2013.01); *B60W 2552/10* (2020.02); *B60W 2554/402* (2020.02); *B60W 2554/4041* (2020.02); *B60W 2554/4042* (2020.02); *B60W 2554/802* (2020.02); *B60W 2556/40* (2020.02); *B60W 2710/18* (2013.01); *B60W 2710/20* (2013.01); *B60W 2720/10* (2013.01); *G06V 20/58* (2022.01); *G06V 2201/08* (2022.01)

(58) Field of Classification Search
CPC ......... B60W 2556/65; B60W 2710/18; B60W 2710/20; B60W 2720/10; B60W 30/143; B60W 30/18163; B60W 60/0011; B60W 60/0017; B60W 60/0027; G01C 21/3415; G06V 20/58; G06V 2201/08; G08G 1/0965; G08G 1/096725; G08G 1/096791
See application file for complete search history.

(56) References Cited

U.S. PATENT DOCUMENTS 10,981,566 B2 * 4/2021 Pitale ........................ B60Q 9/00
11,099,558 B2 * 8/2021 Huang ................. G05D 1/0044
11,541,910 B1 * 1/2023 Ganguli .......... B60W 30/18163
11,816,987 B2 * 11/2023 Dantrey ................. G06N 3/045
11,840,257 B2 * 12/2023 Liu ................. B60W 30/18163
12,036,992 B2 * 7/2024 Chen ................. B60W 30/0953
2007/0132609 A1 * 6/2007 Stackelhouse ......... G08G 1/161
340/904
2015/0266411 A1 * 9/2015 Bennie ................... G08G 1/166
701/36
2016/0093213 A1 * 3/2016 Rider .................... H04W 4/027
701/537
2017/0276495 A1 * 9/2017 Krishnan ......... G08G 1/096741
2017/0300059 A1 * 10/2017 Rust ..................... G05D 1/0231
2017/0301234 A1 * 10/2017 Park ..................... G08G 1/0965
2018/0137756 A1 * 5/2018 Moosaei ............ G08G 1/09675
2019/0051169 A1 * 2/2019 Gomez Gutierrez ........................
G08G 1/0965
2019/0236947 A1 * 8/2019 Wood ...................... H04W 4/46
2019/0354775 A1 * 11/2019 Leizerovich ............ G06T 7/246
2020/0152058 A1 * 5/2020 Edwards .............. G08G 1/0965
2020/0182636 A1 * 6/2020 Ningthoujam ... G08G 1/096725
2020/0209864 A1 * 7/2020 Chen .................. G01C 21/3811
2020/0290618 A1 * 9/2020 Conrad ............... B60W 30/162
2021/0023987 A1 * 1/2021 Bader ................... G01S 13/931
2021/0125494 A1 * 4/2021 Cho ...................... G01S 3/8032
2021/0245741 A1 * 8/2021 Asakura ............... G08G 1/0965
2021/0331680 A1 * 10/2021 Imura ............. B60W 30/18154
2022/0073095 A1 * 3/2022 Seitz ...................... B60K 35/28
2022/0080977 A1 * 3/2022 Ucar ..................... B60W 40/09
2022/0122620 A1 * 4/2022 Watkins ................. G08G 1/166
2022/0157165 A1 * 5/2022 Dantrey ................. G06N 3/045
2022/0272448 A1 * 8/2022 Rajkumar ................ H04R 1/08
2022/0363261 A1 * 11/2022 Buck ..................... B60W 40/04
2023/0001914 A1 * 1/2023 Kim ...................... B60W 30/12
2023/0047689 A1 * 2/2023 Lee ........................ G08G 1/166

FOREIGN PATENT DOCUMENTS

JP 2003-302239 A 10/2003
JP 2019125304 A * 7/2019
JP 6959064 B2 11/2021
JP 2022-80830 A 5/2022
KR 10-2055693 B1 12/2019
KR 10-2313025 B1 10/2021
KR 20230127386 A * 9/2023 .......... B60W 30/181

* cited by examiner

FIG. 2

APPARATUS FOR DRIVER ASSISTANCE AND METHOD OF CONTROLLING THE SAME

CROSS-REFERENCE TO RELATED APPLICATION

This application claims the benefit of Korean Patent Application No. 10-2022-0082888, filed on Jul. 6, 2022 in the Korean Intellectual Property Office, the disclosure of which is incorporated herein by reference.

BACKGROUND

1. Field

Embodiments of the present disclosure relate to an apparatus for changing a traveling lane based on road situations during autonomous driving and a method of controlling the same.

2. Description of the Related Art

Fire and disasters are continuously increasing due to large-scale housing development, industrialization of industrial complexes, increases in flammable objects in local governments, global climate change, and increases in tectonic movements such as earthquakes.

Therefore, emergency vehicles such as ambulances, fire trucks, and police cars are often traveling on roads.

Since it is very important for an emergency vehicle to cope with emergency situations within an optimal period after accidents occur, the emergency vehicle should reach a place in which the emergency situation such as an accident or fire has occurred in the shortest possible time. Here, the optimal period is an initial optimal period for saving lives in accidents or incidents and is a time at which damage caused by the incident can be minimized and as many people as possible can be saved.

Even when the emergency vehicles can preferentially pass under the Road Traffic Act and alert drivers of other vehicles of the emergency dispatch using lights and sirens, the emergency vehicles have trouble traveling due to many general vehicles on the road.

Therefore, a problem that the emergency vehicles are spending much time on the road during travel occurs, and a problem of missing the optimal period also occurs.

SUMMARY

Therefore, it is an aspect of the present disclosure to provide an apparatus for changing a traveling lane of a vehicle based on traveling route information and traveling lane information of an emergency vehicle and a method of controlling the same.

Additional aspects of the disclosure will be set forth in part in the description which follows and, in part, will be obvious from the description, or may be learned by practice of the disclosure.

In accordance with one aspect of the present disclosure, an apparatus for driver assistance provided in a vehicle includes a camera module, a radar module, and a processor configured to determine whether a traveling route of the vehicle needs to be changed based on received traveling route information of an emergency vehicle and traveling route information of the vehicle upon receiving the traveling route information of the emergency vehicle through a communicator of the vehicle during autonomous driving, and control the autonomous driving along a traveling route changed based on at least one of output data of the camera module or output data of the radar module when it is determined that the traveling route of the vehicle needs to be changed.

The processor may determine whether a same route, where traveling routes of the emergency vehicle is overlapped with traveling routes of the vehicle, is present based on the received traveling route information of the emergency vehicle and the traveling route information of the vehicle, and determine whether an avoidance route is present based on current position information, destination information of the vehicle and the same route when it is determined that the same route is present.

The processor may determine whether the emergency vehicle is adjacent to the vehicle based on received position information of the emergency vehicle and position information of the vehicle upon receiving the position information of the emergency vehicle through the communicator and control the vehicle to change a traveling lane when it is determined that the emergency vehicle is adjacent to the vehicle.

The processor may analyze a frequency pattern of a sound collected by a sound collector of the vehicle, and determine that the emergency vehicle is adjacent to the vehicle when it is determined that the collected sound is a sound having a siren sound frequency pattern based on the analysis.

The processor may determine whether the emergency vehicle is adjacent to the vehicle based on at least one of position information of the emergency vehicle received through the communicator or a sound collected by a sound collector of the vehicle, and determine whether the emergency vehicle is adjacent to the vehicle based on image information acquired by the camera module when it is determined that the emergency vehicle is adjacent to the vehicle. The processor may acquire distance information and traveling speed information of the emergency vehicle based on the image information acquired by the camera module when it is determined that the emergency vehicle is adjacent to the vehicle, and control at least one of steering or a traveling speed based on the distance information, the traveling speed information of the emergency vehicle and traveling speed information of the vehicle.

The processor may determine whether the emergency vehicle is adjacent to the vehicle based on at least one of position information of the emergency vehicle received through the communicator or a sound collected by a sound collector of the vehicle, and determine whether the emergency vehicle is adjacent to the vehicle based on radar information of the radar module when it is determined that the emergency vehicle is adjacent to the vehicle. The processor may acquire distance information and traveling speed information of the emergency vehicle based on the radar information acquired by the radar module when it is determined that the emergency vehicle is adjacent to the vehicle, and control at least one of steering or a traveling speed based on the distance information, the traveling speed information of the emergency vehicle and traveling speed information of the vehicle.

The processor may determine whether the emergency vehicle is adjacent to the vehicle based on at least one of position information of the emergency vehicle received through the communicator or a sound collected by a sound collector of the vehicle, determine whether an object of the emergency vehicle is present in an image of image information acquired by the camera module when it is determined that the emergency vehicle is adjacent to the vehicle, acquire distance information and traveling speed information of the emergency vehicle based on radar information of the radar module when it is determined that the object of the emergency vehicle is present in the image, and control at least one of steering or a traveling speed based on the distance information, the traveling speed information of the emergency vehicle and traveling speed information of the vehicle.

The processor may acquire position information of the traveling lane in which the vehicle travels and position information of a traveling lane of the emergency vehicle based on the image information acquired by the camera module, acquire road information based on pre-stored map information and the position information of the vehicle, and determine whether the traveling lane of the vehicle needs to be changed based on the acquired road information, position information of the traveling lane of the vehicle, and position information of the traveling lane of the emergency vehicle.

When it is determined that the traveling lane of the vehicle needs to be changed, the processor may acquire position information of the lane to be changed based on the acquired road information, the position information of the traveling lane of the vehicle, the position information of the traveling lane of the emergency vehicle, and obstacle information acquired by the radar module, and control the steering and the traveling speed to move to the acquired changed lane.

The processor may determine whether the vehicle is to stop in the changed lane based on the road information, the obstacle information, and the position information of the lane to be changed when the vehicle moves to the acquired changed lane, set a point at which the vehicle has traveled at a constant speed for a preset time from an entry point of the changed lane to a stop point when it is determined that the vehicle is to stop in the changed lane, control the steering and the traveling speed from the traveling lane to the stop point of the vehicle, and control braking when it is determined that a current position of the vehicle is the entry point of the changed lane based on position information of a position receiver.

The processor may control the steering and the traveling speed from the traveling lane to the stop point of the vehicle when it is determined that the vehicle is not to stop in the changed lane, acquire a target traveling speed corresponding to the road information when it is determined that the current position of the vehicle is the entry point of the changed lane based on the position information of the position receiver, and control travel at the acquired target traveling speed.

In accordance with another aspect of the present disclosure, a method of controlling an apparatus for driver assistance including a camera module and a radar module includes determining whether an emergency vehicle is adjacent to a vehicle based on at least one of position information of the emergency vehicle received through a communicator of the vehicle or a sound collected by a sound collector of the vehicle during autonomous driving, determining whether the emergency vehicle is adjacent to the vehicle based on at least one of image information acquired by the camera module or radar information acquired by the radar module when it is determined that the emergency vehicle is adjacent to the vehicle, and controlling the vehicle to change a traveling lane when it is determined that the emergency vehicle is adjacent to the vehicle.

The method may further include determining whether a same route, where traveling routes of the emergency vehicle is overlapped with traveling routes of the vehicle, is present based on received traveling route information of the emergency vehicle and traveling route information of the vehicle upon receiving the traveling route information of the emergency vehicle through the communicator, determining whether an avoidance route is present based on current position information, destination information of the vehicle and the same route when it is determined that the same route is present, and controlling autonomous driving based on the avoidance route when it is determined that the avoidance route is present.

The method may further include analyzing a frequency pattern of the sound collected by the sound collector, and determining that the emergency vehicle is adjacent to the vehicle when it is determined that the collected sound is a sound having a siren sound frequency pattern based on the analysis.

The method may further include acquiring distance information and traveling speed information of the emergency vehicle based on the image information acquired by the camera module when it is determined that the emergency vehicle is adjacent to the vehicle, and controlling at least one of steering or a traveling speed based on the distance information, the traveling speed information of the emergency vehicle and traveling speed information of the vehicle.

The method may further include acquiring distance information and traveling speed information of the emergency vehicle based on the radar information acquired by the radar module when it is determined that the emergency vehicle is adjacent to the vehicle, and controlling at least one of steering or a traveling speed based on the distance information, the traveling speed information of the emergency vehicle and traveling speed information of the vehicle.

The method may further include acquiring position information of the traveling lane in which the vehicle travels and position information of a traveling lane of the emergency vehicle based on the image information acquired by the camera module, acquiring road information based on pre-stored map information and the position information of the vehicle, and determining whether the traveling lane of the vehicle needs to be changed based on the acquired road information, position information of the traveling lane of the vehicle, and position information of the traveling lane of the emergency vehicle.

The method may further include acquiring position information of a lane to be changed based on the acquired road information, the position information of the traveling lane of the vehicle, the position information of the traveling lane of the emergency vehicle, and obstacle information acquired by the radar module when it is determined that the traveling lane of the vehicle needs to be changed, and controlling steering and a traveling speed to move to the acquired changed lane.

The method may further include determining whether the vehicle is to stop in the changed lane based on the road information, the obstacle information, and the position information of the changed lane when the vehicle moves to the acquired changed lane, setting a point at which the vehicle has traveled at a constant speed for a preset time from an entry point of the changed lane to a stop point when it is determined that the vehicle is to stop in the changed lane, controlling the steering and the traveling speed from the traveling lane to the stop point of the vehicle, and controlling braking when it is determined that a current position of the vehicle is the entry point of the changed lane based on position information of a position receiver.

The method may further include controlling the steering and the traveling speed from the traveling lane to the stop point of the vehicle when it is determined that the vehicle is not to stop in the changed lane, acquiring a target traveling speed corresponding to the road information when it is determined that the current position of the vehicle is the entry point of the changed lane based on the position information of the position receiver, and controlling travel at the acquired target traveling speed.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 2 is a configuration diagram of a driver assistance system provided in the vehicle according to the embodiment;

DETAILED DESCRIPTION

The same reference numbers indicate the same components throughout the specification. This specification does not describe all elements of embodiments, and general contents or overlapping contents between the embodiments in the technical field to which the present disclosure pertains will be omitted.

The terms "unit," "module," "member," and "block" used in the specification may be implemented as software or hardware, and according to the embodiments, a plurality of "units," "modules," "members," and "blocks" may be implemented as one component, or one "unit," "module," "member," and "block" may also include a plurality of components.

Throughout the specification, when a certain portion is described as being "connected" to another, this includes not only a case in which the certain portion is directly connected thereto but also a case in which the certain portion is indirectly connected thereto, and the indirect connection includes connection through a wireless communication network.

In addition, when a certain portion is described as "including," a certain component, this means further including other components rather than precluding other components unless especially stated otherwise.

Throughout the specification, when a certain member is described as being positioned "on" another, this includes both a case in which the certain member is in contact with another and a case in which other members are present between the two members.

Terms such as "first" and "second" are used to distinguish one component from another, and the components are not limited by these terms.

A singular expression includes plural expressions unless the context clearly dictates otherwise.

In each operation, identification symbols are used for convenience of description, and the identification symbols do not describe the sequence of each operation, and each operation may be performed in a different sequence from the specified sequence unless a specific sequence is clearly described in context.

Hereinafter, an operation principle and embodiments of the present disclosure will be described with reference to the accompanying drawings.

Figure 1:
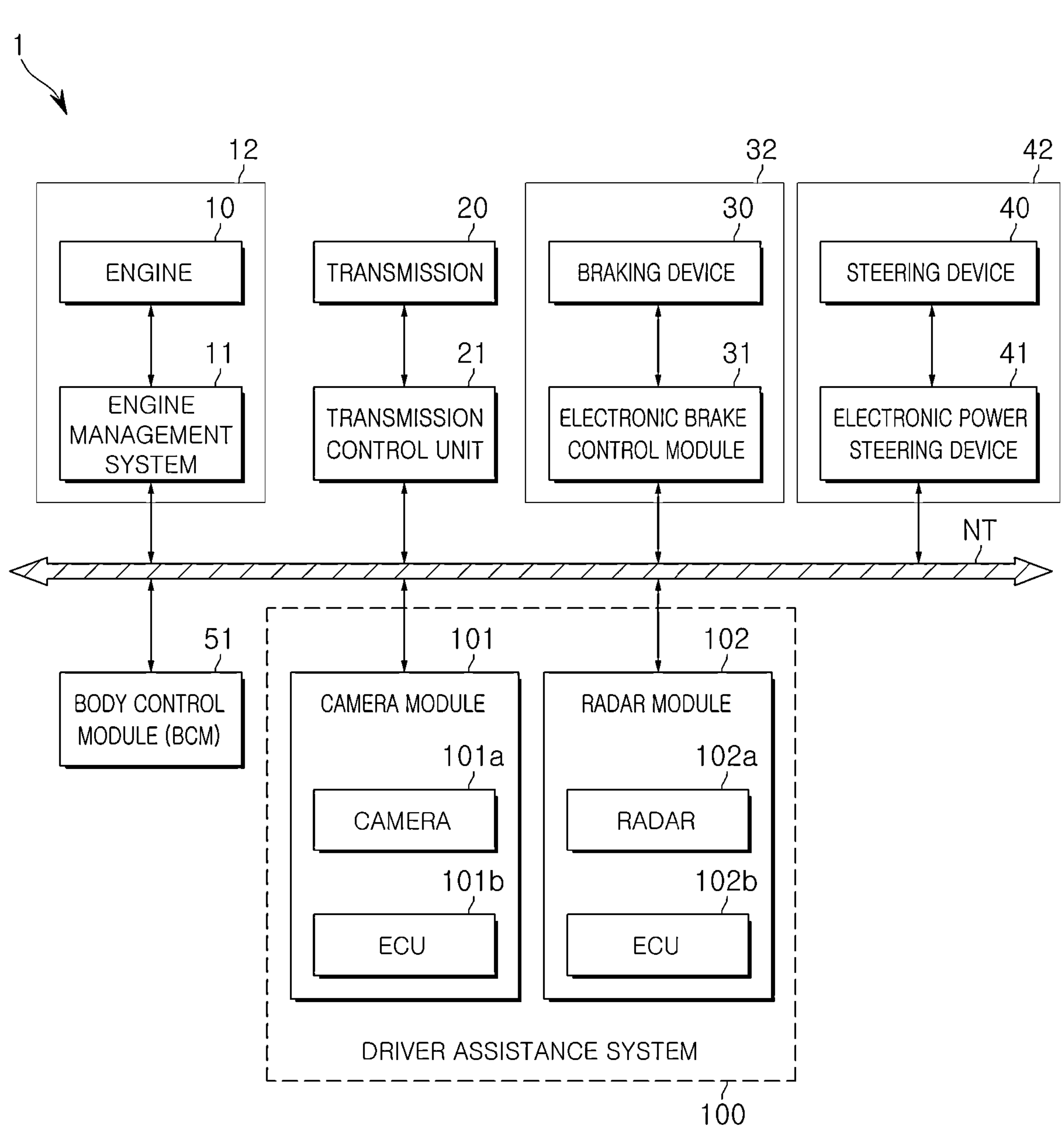
FIG. 1 is a configuration diagram of a vehicle according to an embodiment.

FIG. 1 is a configuration diagram of a vehicle according to an embodiment.

The vehicle according to the embodiment may be a vehicle that operates in a manual driving mode in which the vehicle travels in response to a driver's driving intention and an autonomous driving mode in which the vehicle autonomously travels to a destination based on current position information and destination information of the vehicle.

The vehicle according to the embodiment may be an internal combustion engine vehicle or an eco-friendly vehicle.

In this embodiment, a vehicle executing the autonomous driving mode among internal combustion engine vehicles will be described as an example.

As illustrated in FIG. 1, a vehicle 1 includes an engine 10, a transmission 20, a braking device 30, and a steering device 40.

The engine 10 may include a cylinder and a piston and generate power for the vehicle 1 to travel.

The transmission 20 may include a plurality of gears and transmit the power generated by the engine 10 to wheels.

The braking device 30 may decelerate the vehicle 1 or stop the vehicle 1 through friction with the wheels.

The steering device 40 may change a traveling direction of the vehicle 1.

The vehicle 1 may include a plurality of electronic components.

For example, the vehicle 1 further includes an engine management system (EMS) 11, a transmission control unit (TCU) 21, an electronic brake control module 31, an electronic power steering (EPS) device 41, a body control module (BCM), and a driver assistance system (DAS).

The EMS 11 may control the engine 10 in response to a driver's acceleration intention conveyed through an accelerator pedal or a request of the DAS 100. For example, the EMS 11 may control a torque of the engine 10.

The TCU 21 may control the transmission 20 in response to a driver's transmission instruction conveyed through a transmission lever (or also referred to as a gear lever, a shifting lever, or a gear shift) and/or a traveling speed of the vehicle 1. For example, the TCU 21 may adjust a transmission ratio from the engine to the wheels.

The electronic brake control module 31 may control the braking device 30 in response to a driver's braking intention conveyed through a brake pedal and/or slips of the wheels. For example, the electronic brake control module 31 may temporarily release braking of the wheels in response to the slips of the wheels detected during braking of the vehicle 1 (anti-lock braking system (ABS)).

The electronic brake control module 31 may selectively release the braking of the wheels in response to oversteering and/or understeering detected during steering of the vehicle 1 (electronic stability control (ESC)).

In addition, the electronic brake control module 31 may temporarily brake the wheels in response to the slips of the wheels detected during driving of the vehicle 1 (traction control system (TCS)).

The EPS device 41 may assist with an operation of the steering device 40 so that the driver may easily manipulate a steering wheel in response to the driver's steering intention conveyed through the steering wheel. For example, the EPS device 41 may assist with an operation of the steering device 40 to reduce a steering force during low-speed travel or when parked and increase the steering force during high-speed travel.

The BCM 51 may control operations of electronic components for providing convenience to the driver or ensuring the driver's safety. For example, the BCM 51 may control head lamps, wipers, a cluster, multi-function switches, turn signal lamps, etc.

The DAS 100 may assist the driver in manipulating (driving, braking, and steering) the vehicle 1. For example, the DAS 100 may detect objects (e.g., another vehicle, a pedestrian, a cyclist, a lane line, and a traffic sign) in an environment around the vehicle 1 and control the driving, braking, and/or steering of the vehicle 1 in response to the detected environment.

The DAS 100 may provide various functions to the driver. For example, the DAS 100 may provide a lane departure warning (LDW), lane keeping assist (LKA), high beam assist (HBA), autonomous emergency braking (AEB), traffic sign recognition (TSR), smart cruise control (SCC), blind spot detection (BSD), etc.

The DAS 100 may allow the vehicle itself to recognize a road environment, determine obstacles and a traveling situation, and control the traveling of the vehicle along a scheduled traveling route while avoiding obstacles to automatically travel to a destination.

The DAS 100 includes a camera module 101 for acquiring image data around the vehicle 1 and a radar module 102 for acquiring obstacle data around the vehicle 1.

The camera module 101 may include a camera 101*a* and an electronic control unit (ECU) 101*b*, capture surroundings of the vehicle 1, and recognize another vehicle, a pedestrian, a cyclist, a lane line, a traffic sign, etc.

The radar module 102 may include a radar 102*a* and an ECU 102*b* and acquire a relative position, a relative speed, etc. of the obstacle (e.g., another vehicle, a pedestrian, or a cyclist) near the vehicle 1.

The above-described electronic components may communicate with each other via a vehicle communication network NT. For example, the electronic components may transmit or receive data via Ethernet, media oriented systems transport (MOST), Flexray, a controller area network (CAN), a local interconnect network (LIN), etc.

The DAS 100 may transmit a driving control signal, a braking control signal, and a steering control signal to the EMS 11, the electronic brake control module 31, and the EPS device 41, respectively, via the vehicle communication network NT.

Figure 2:
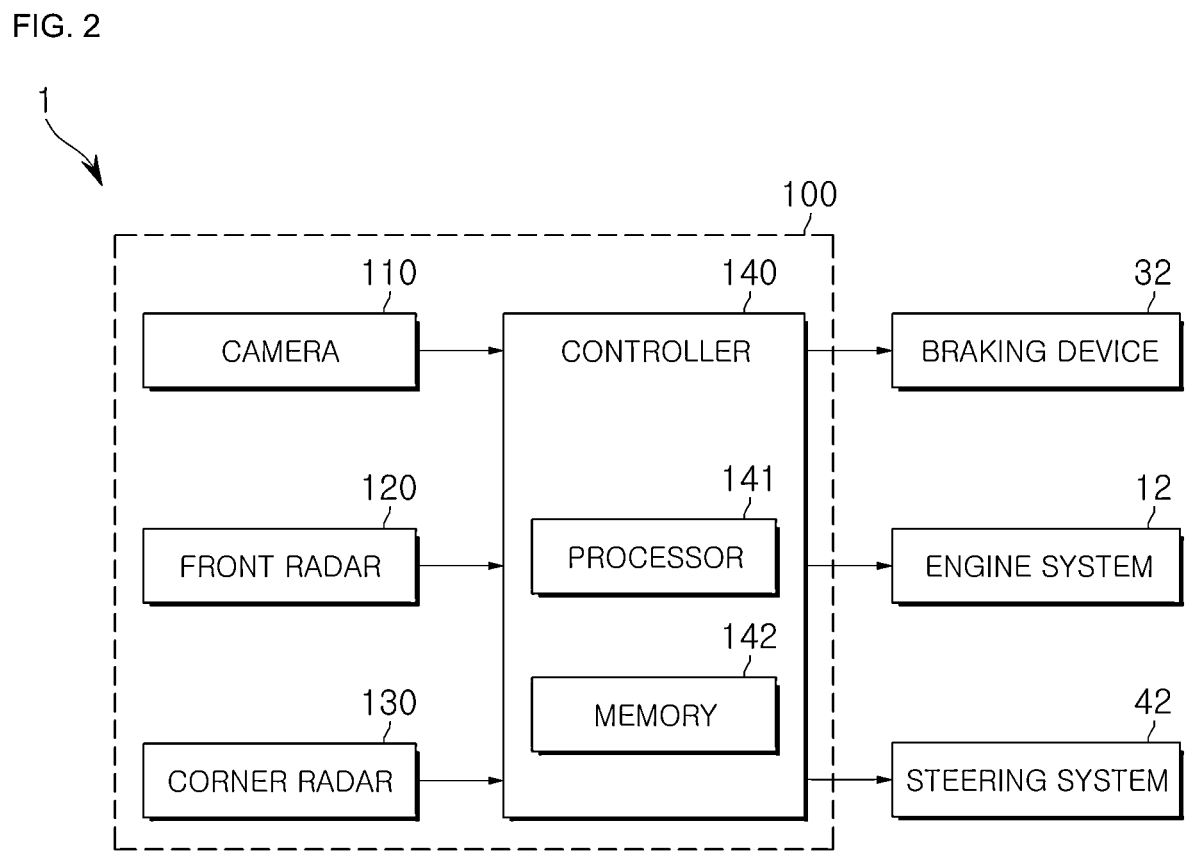
Figure 3:
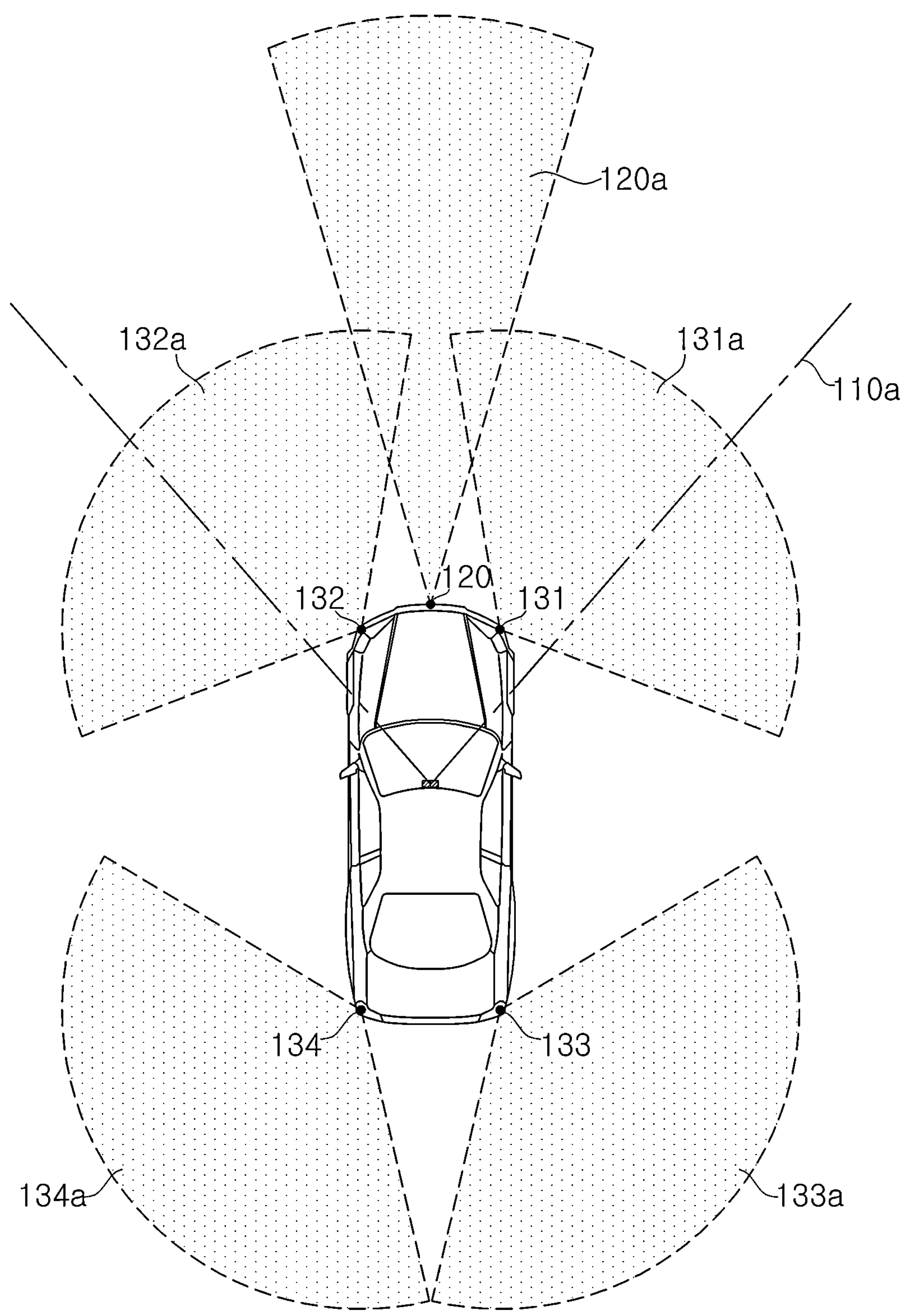
FIG. 3 is an exemplary view of detection regions of a camera and a radar included in the driver assistance system of the vehicle according to the embodiment.

FIG. 2 is a configuration diagram of a driver assistance system provided in the vehicle according to the embodiment, and FIG. 3 is an exemplary view of detection regions of a camera and a radar included in the driver assistance system of the vehicle according to the embodiment.

As illustrated in FIG. 2, the vehicle 1 may include a braking system 32, an engine system 12, a steering system 42, and the DAS 100.

The engine system 12 may include the EMS 11 and the engine 10 described with reference to FIG. 1, the braking system 32 may include the electronic brake control module 31 (see FIG. 1) and the braking device 30 (see FIG. 1) described with reference to FIG. 1, and the steering system 42 may include the EPS device 41 (see FIG. 1) and the steering device 40 (see FIG. 1).

The DAS 100 according to this embodiment may include a camera 110 as a camera of the camera module 101 and further include a rear camera and left and right side cameras.

The DAS 100 according to this embodiment may include a front radar 120 and a plurality of corner radars 130 (131, 132, 133, and 134) as radars of the radar module 102.

As illustrated in FIG. 3, the DAS 100 may include the camera 110 for securing a forward field of view 110*a* of the vehicle 1, the front radar 120, and the plurality of corner radars 130.

For example, the camera 110 may be installed on a front windshield of the vehicle 1.

The camera 110 may capture a forward image from the vehicle 1 and acquire forward image data of the vehicle 1. The forward image data of the vehicle 1 may include position information on at least one of another vehicle, a pedestrian, a cyclist, a lane line, a curb, a guardrail, a tree, or a streetlight positioned in front of the vehicle 1.

The camera 110 may include a plurality of lenses and an image sensor. The image sensor may include a plurality of photodiodes for converting light into electrical signals, and the plurality of photodiodes may be disposed in the form of a two-dimensional matrix.

The camera 110 may be electrically connected to a controller 140. For example, the camera 110 may be connected to the controller 140 via the vehicle communication network NT, connected to the controller 140 via a hard wire, or connected to the controller 140 via a printed circuit board (PCB).

The camera 110 may transmit the forward image data of the vehicle 1 to the controller 140.

The front radar 120 may have a forward field of sensing 120*a* of the vehicle 1. The front radar 120 may be installed, for example, on a grille or a bumper of the vehicle 1.

The front radar 120 may include a transmission antenna (or a transmission antenna array) for radiating transmission radio waves forward from the vehicle 1 and a reception antenna (or a reception antenna array) for receiving reflected radio waves reflected from an obstacle.

The front radar 120 may acquire forward radar data from the transmission radio waves transmitted by the transmission antenna and the reflected radio waves received by the reception antenna.

The forward radar data may include distance information and speed information on another vehicle, a pedestrian, or a cyclist positioned in front of the vehicle 1.

The front radar 120 may calculate a relative distance to an obstacle based on a phase difference (or a time difference) between the transmission radio waves and the reflected radio waves and calculate a relative speed of the obstacle based on a frequency difference between the transmission radio waves and the reflected radio waves.

The front radar 120 may be connected to the controller 140 via, for example, the vehicle communication network NT, the hard wire, or the PCB. The front radar 120 may transmit the forward radar data to the controller 140.

The plurality of corner radars 130 include the first corner radar 131 installed at a front right side of the vehicle 1, the second corner radar 132 installed at a front left side of the vehicle 1, the third corner radar 133 installed at a rear right side of the vehicle 1, and the fourth corner radar 134 installed at a rear left side of the vehicle 1.

The first corner radar 131 may have a forward and rightward field of sensing 131*a* of the vehicle 1. The first corner radar 131 may be installed at a right side of a front bumper of the vehicle 1.

The second corner radar 132 may have a forward and leftward field of sensing 132*a* of the vehicle 1 and may be installed at a left side of the front bumper of the vehicle 1.

The third corner radar 133 may have a rearward and rightward field of sensing 133*a* of the vehicle 1 and may be installed at a right side of a rear bumper of the vehicle 1.

The fourth corner radar 134 may have a rearward and leftward field of sensing 134*a* of the vehicle 1 and may be installed at a left side of the rear bumper (rear panel) of the vehicle 1.

Each of the first, second, third, and fourth corner radars 131, 132, 133, and 134 may include the transmission antenna and the reception antenna.

The first, second, third, and fourth corner radars 131, 132, 133, and 134 may acquire first corner radar data, second corner radar data, third corner radar data, and fourth corner radar data, respectively.

The first corner radar data may include distance information and speed information on another vehicle, a pedestrian, or a cyclist (hereinafter referred to as "obstacle") positioned at the front right side of the vehicle 1.

The second corner radar data may include distance information and speed information on an obstacle positioned at the front left side of the vehicle 1.

The third and fourth corner radar data may include distance information and speed information on obstacles positioned at the rear right side of the vehicle 1 and the rear left side of the vehicle 1.

Each of the first, second, third, and fourth corner radars 131, 132, 133, and 134 may be connected to the controller 140 via the vehicle communication network NT, the hard wire, or the PCB. The first, second, third, and fourth corner radars 131, 132, 133, and 134 may respectively transmit the first, second, third, and fourth corner radar data to the controller 140.

The controller 140 may include the ECU 101*b* (see FIG. 1) of the camera module 101 (see FIG. 1), the ECU 102*b* (see FIG. 1) of the radar module 102 (see FIG. 1), and/or a separate integrated ECU.

The controller 140 includes a processor 141 and a memory 142.

The processor 141 may process the forward image data of the camera 110, the forward radar data of the front radar 120, and the corner radar data of the plurality of corner radars 130 and generate an acceleration signal, a braking signal, and a steering signal for controlling the engine system 12, the braking system 32, and the steering system 42.

For example, the processor 141 may include an image signal processor for processing the forward image data of the camera 110, a digital signal processor for processing the radar data of the radars 120 and 130, and/or a micro control unit (MCU) for generating the braking signal and the steering signal.

The processor 141 may detect obstacles (e.g., another vehicle, a pedestrian, a cyclist, a curb, a guardrail, a tree, or a streetlight) in front of the vehicle 1 based on the forward image data of the camera 110 and the forward radar data of the front radar 120.

Specifically, the processor 141 may acquire position information (distances and directions) and speed information (relative speeds) of the obstacles in front of the vehicle 1 based on the forward radar data of the front radar 120. The processor 141 may acquire the position information (directions) and type information (e.g., whether the obstacle is another vehicle, a pedestrian, a cyclist, a curb, a guardrail, a tree, or a streetlight) of the obstacles in front of the vehicle 1 based on the forward radar data of the camera 110.

In addition, the processor 141 may match the obstacles detected by the forward image data with the obstacles detected by the forward radar data and acquire the type information, the position information, and the speed information of the obstacles in front of the vehicle 1 based on the matching result.

The processor 141 may generate the acceleration signal, the braking signal, and the steering signal based on the type information, the position information, and the speed information of the front obstacles during the execution of the autonomous driving mode and allow the vehicle to autonomously travel to the destination based on the generated acceleration signal, braking signal, and steering signal.

For example, the processor 141 may calculate a time to collision (TTC) between the vehicle 1 and the front obstacle based on the position information (relative distances) and the speed information (relative speeds) of the front obstacles and warn a driver of collision, transmit the braking signal to the braking system 32, or transmit the steering signal to the steering system 42 based on a comparison result between the TTC and a predetermined reference time.

The processor 141 may transmit the steering signal to the steering system 42 based on direction information among the position information of the front obstacles.

As another example, the processor 141 may calculate a distance to collision (DTC) based on the speed information (i.e., the relative speeds) of the front obstacles and warn the driver of collision or transmit the braking signal to the braking system 32 based on a comparison result between the DTC and distances to the front obstacles.

The processor 141 may acquire position information (distances and directions) and speed information (relative speeds) on obstacles positioned at sides (a front right side, a front left side, a rear right side, and a rear left side) of the vehicle 1 based on the corner radar data of the plurality of corner radars 130.

The memory 142 may store a program and/or data for the processor 141 to process the image data, a program and/or data for the processor 141 to process the radar data, and a program and/or data for the processor 141 to generate the braking signal and/or the steering signal.

The memory 142 may temporarily store the image data received from the camera 110 and/or the radar data received from the radars 120 and 130 and temporarily store the processing result of the image data and/or the radar data of the processor 141.

The memory 142 may include not only volatile memories such as a static random access memory (SRAM) and a dynamic RAM (DRAM) but also nonvolatile memories such as a flash memory, a read only memory (ROM), and an erasable programmable ROM (EPROM).

A detailed configuration of the vehicle equipped with the DAS for generating an avoidance route based on a reference route to a destination during the execution of the autonomous driving mode and allowing the vehicle to autonomously travel to the destination will be described with reference to FIG. 4.

Figure 4:
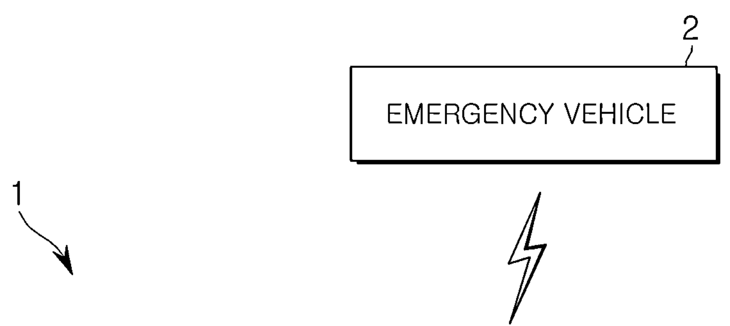
FIG. 4 is a detailed control configuration diagram of the vehicle equipped with the driver assistance system according to the embodiment.
Figure 4:
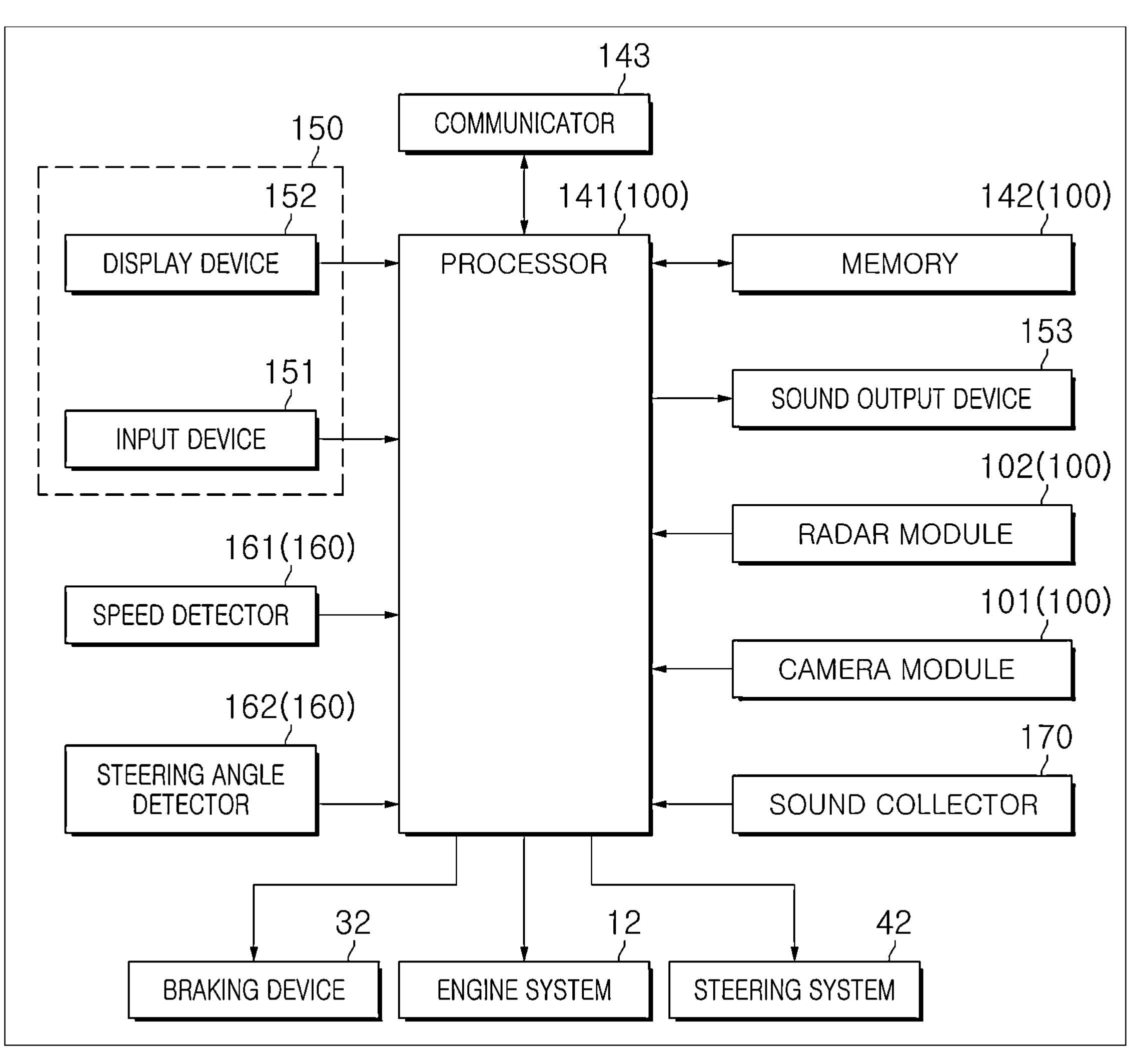

FIG. 4 is a detailed control configuration diagram of the vehicle equipped with the DAS according to the embodiment.

The vehicle 1 may include the engine system 12, the braking system 32, the steering system 42, the DAS 100, a user interface 150, a traveling information detector 160, and a sound collector 170.

Since the engine system 12, the braking system 32, and the steering system 42 have been described with reference to FIGS. 1 and 2, descriptions thereof will be omitted.

A configuration of the processor 141 of the DAS 100 will be finally described with reference to FIGS. 5A, 5B, 6, and 7.

In addition to the components illustrated in FIG. 2, the DAS 100 may further include a communicator 143.

The communicator 143 may communicate with an external device. The external device may include at least one of a road infrastructure, a user terminal, another vehicle, or a server. The vehicle 1 may perform vehicle-to-infrastructure (i.e., structure) (V2I) communication, vehicle-to-vehicle (V2V) communication, and vehicle-to-pedestrian (V2P) communication.

The communicator 143 further includes a position receiver. Here, the position receiver receives position information corresponding to a current position of a host vehicle and transmits the received position information to the processor 141.

The position receiver may include a Global Positioning System (GPS) receiver. Here, the GPS receiver includes an antenna module for receiving signals of a plurality of GPS satellites and a signal processor. The signal processor includes software for acquiring the current position using distance and time information corresponding to position signals of the plurality of GPS satellites and a transmitter for transmitting the acquired position information of the vehicle.

The communicator 143 may communicate with various electronic devices in the DAS 100 and also communicate with various electronic devices in the vehicle 1.

The communicator 143 may include one or more components for allowing the external device to communicate with various internal electronic devices and include, for example, at least one of a short-distance communication module, a wired communication module, or a wireless communication module.

The short-range communication module may include various short-range communication modules for transmitting and receiving signals using a wireless communication network at a short distance, such as a Bluetooth module, an infrared communication module, a radio frequency identification (RFID) communication module, a wireless local access network (WLAN) communication module, a near-field communication (NFC) communication module, and a ZigBee communication module.

The wired communication module may include not only various wired communication modules such as a controller area network (CAN), a local area network (LAN) module, a wide area network (WAN) module, and a value added network (VAN) module, but also various cable communications such as Universal Serial Bus (USB), High Definition Multimedia Interface (HDMI), digital visual interface (DVI), recommended standard 232 (RS-232), power line communication, and plain old telephone service (POTS).

In addition to the WiFi module and the wireless broadband (WiBro) module, the wireless communication module may include a wireless communication module for supporting various wireless communication methods such as Global System for Mobile Communications (GSM), code division multiple access (CDMA), wideband code division multiple access (WCDMA), Universal Mobile Telecommunications System (UMTS), time division multiple access (TDMA), and Long Term Evolution (LTE).

The communicator 143 may be provided in each of the DAS 100 and the vehicle 1.

The communicator 143 of the DAS 100 may also communicate with the communicator (i.e., the communication network NT) provided in the vehicle 1.

The camera module 101 and the radar module 102 may be components provided in the DAS 100 or components provided in the vehicle 1. When the camera module 101 and the radar module 102 are provided in the vehicle, the camera module 101 and the radar module 102 may transmit or receive information with the DAS 100 through communication.

The camera module 101 detects information on a road and objects around the vehicle 1 to convert the information into electrical image signals, detects an external environment of the vehicle at the current position of the vehicle, in particular, the information on the road on which the vehicle travels and objects around the vehicle, and transmits image signals of the detected information on the road and the objects to the processor 141.

The camera module 101 may include a camera, and the camera may include a charge-coupled device (CCD) or complementary metal-oxide semiconductor (CMOS) image sensor.

The camera may further include a front camera, a rear camera, and left and right side cameras.

The front camera acquires a forward image of the vehicle 1 and transmits the acquired forward image to the processor 141.

The rear camera acquires a rearward image from the vehicle 1 and transmits the acquired rearward image to the processor 141.

The left and right side cameras acquire leftward and rightward images from the vehicle 1 and transmits the acquired leftward and rightward images to the processor 141. Therefore, the processor 141 may allow the vehicle to recognize other vehicles positioned at the front, left, right, and rear sides of the vehicle 1.

The radar module 102 includes the front radar and the corner radars.

The front radar 120 (see FIG. 2) and the corner radars 130 (see FIG. 2) may be obstacle detectors for detecting obstacles. Since the front radar 120 and the corner radars 130 have been described with reference to FIG. 3, descriptions thereof will be omitted.

The obstacle detectors detect obstacles positioned at the front and the left and right sides of the vehicle 1 and transmit obstacle information on the detected obstacles to the processor 141. Here, the obstacle information may include position information of the obstacles, and the position information of the obstacles may include distance information of the obstacles and direction information of the obstacles. The distance information on distances to the obstacles may be distance information on relative distances with the obstacles.

In addition to the front radar 120 and the corner radars 130 as the obstacle detectors, the vehicle 1 may further include at least one of a light detection and ranging (LiDAR) sensor or an ultrasonic sensor and may further include at least one camera.

The LiDAR sensor is a non-contact distance detection sensor using a laser radar principle. The LiDAR sensor may include a transmitter for transmitting laser and a receiver for receiving the laser that returns after being reflected from a surface of an object present in a range of the sensor.

The ultrasonic sensor generates ultrasonic waves for a predetermined time and then detects a signal that returns after being reflected from the object. The ultrasonic sensor may be used to determine whether an obstacle such as a pedestrian is present in a short range.

The user interface 150 may include an input device 151 for receiving a user's input and a display device 152 for displaying various pieces of information.

The user interface 150 may be an audio video navigation (AVN) for a vehicle for performing at least one of a radio function, an audio function, a video function, a map display function, a navigation function, a digital multimedia broadcasting (DMB) function, a content playback function, or an Internet search function.

The input device 151 may receive an ON instruction and an OFF instruction of the autonomous driving mode and transmit signals of the received instructions to the processor 141.

The input device 151 may receive an operation instruction for any one of functions that may be performed in the vehicle 1. For example, the input device 151 may receive an operation instruction for at least one of the radio function, the audio function, the video function, the map display function, the navigation function, the DMB function, the content playback function, or the Internet search function.

The input device 151 may receive a target traveling speed for executing the autonomous driving mode and also receive destination information.

The input device 151 may also selectively receive any one of a plurality of routes from a departure point to a destination point.

The input device 151 may also receive an emergency mode to interwork with an emergency mode of an emergency vehicle.

The input device 151 may be provided on a head unit or a center fascia in the vehicle 1 and may also be provided on the user interface 150. The input device 151 may be provided as a button, a key, a switch, a manipulation lever, a jog dial, etc. and may also be provided as a touch pad.

The display device 152 displays operation information on a function being performed in the vehicle 1 or by the user interface 150. For example, the display device 152 displays information on a phone call, displays content information output through the user interface 150, displays information on music playback, and displays external broadcasting information.

The display device 152 may display map information in a navigation mode and also display map information and road guidance information, which are matched with a route to a destination.

The display device 152 may display an image of the road or also display position information of a pedestrian and position information of another vehicle.

The display device 152 may display collision risk information notifying of collision with an obstacle as an image.

The display device 152 may display acceleration information, deceleration information, and steering information for obstacle avoidance as images.

The display device 152 may display traveling information on a target traveling speed and an actual traveling speed in the autonomous driving mode.

The display device 152 may display route information of the emergency vehicle upon receiving the route information from the emergency vehicle during the execution of the emergency mode or display route information of a host vehicle and the route information of the emergency vehicle together.

The display device 152 may display a position of the emergency vehicle when the emergency vehicle is positioned adjacent to the host vehicle during the execution of the emergency mode and display the position of the emergency vehicle together with a position of the host vehicle.

The display device 152 may be a lamp such as a light emitting diode (LED) or a flat panel display device such as a liquid crystal display (LCD).

When the input device 151 is formed of a touch panel, the display device 152 may be provided as a flat or curved touch screen provided integrally with the touch panel.

The user interface 150 may further include a sound output device 153.

The sound output device 153 may output operation information and guidance information on a function being performed in the vehicle 1 or by the user interface 150 as a sound in response to a control instruction of the processor 141. For example, the sound output device 153 may output a sound for road guidance in response to the control instruction of the processor 141 during the execution of the navigation mode.

The sound output device 153 may output warning information as a sound to notify of risk of collision with an obstacle.

The sound output device 153 may output guidance information corresponding to the approach of the emergency vehicle as a sound and output guidance information on a change in a traveling lane due to the emergency vehicle as a sound.

The sound output device 153 may be one speaker or two or more speakers.

The sound output device 153 outputs a sound at a level corresponding to the control instruction of the processor 141.

The vehicle 1 may include the traveling information detector 160 for detecting traveling information of the vehicle, such as traveling speed information, traveling direction information, acceleration information, yaw rate information, deceleration information, and acceleration information. Here, the acceleration information may include transverse acceleration information and longitudinal acceleration information with respect to a body of the vehicle.

The traveling information detector 160 may include a speed detector 161 and a steering angle detector 162.

The speed detector 161 may include a plurality of wheel speed sensors. The speed detector 161 may include an acceleration sensor. The speed detector 161 may include the plurality of wheel speed sensors and the acceleration sensor.

When the speed detector 161 is the acceleration sensor, the processor 141 may acquire the acceleration of the vehicle 1 based on the information detected by the acceleration sensor and also acquire the traveling speed of the vehicle 1 based on the acquired acceleration.

When the speed detector 161 is the acceleration sensor and the plurality of wheel speed sensors, the processor 141 may acquire the acceleration of the vehicle 1 based on the information detected by the acceleration sensor and also acquire the traveling speed of the vehicle 1 based on the speed information acquired by the plurality of wheel speed sensors.

The steering angle detector 162 detects an angular speed of the steering wheel for detecting a steering angle of the vehicle 1. That is, the steering angle detector 162 may include an angular speed detector.

The sound collector 170 collects sounds generated around the vehicle and transmits sound signals for the collected sounds to the processor 141.

The sound collector 170 may include one microphone or two or more microphones.

The sound collector 170 may include a directional microphone.

The sound collector 170 may include a microphone array.

Hereinafter, a configuration of the processor 141 will be described with reference to FIGS. 5A, 5B, 6, 7A, 7B, 7C, 8A, and 8B.

(1) The processor 141 executing the autonomous driving mode will be described.

The processor 141 may control the execution of the autonomous driving mode in response to an ON instruction of the autonomous driving mode.

The processor 141 may check the destination information input by the input device 151 during the execution of the autonomous driving mode, check the current position information received by the position receiver, set the checked current position information to departure position information, retrieve the traveling route from the departure to the destination based on departure information and destination information, acquire road guidance information on the retrieved traveling route, and control the display device 152 to display navigation information matched with the map information, the departure information, the destination information, the traveling route information, and the road guidance information as an image.

The processor 141 may periodically check the current position information of the vehicle during travel in response to the autonomous driving mode and control the display device 152 to display the navigation information matched with the checked current position information of the vehicle as the image.

The processor 141 may also control the operation of the sound output device 153 to output the navigation information as a sound during travel in response to the autonomous driving mode.

When a plurality of traveling routes from the departure to the destination are present, the processor 141 may control the display device 152 to display traveling route information on the plurality of traveling routes.

The processor 141 may control the display device 152 to display detailed information on each of the plurality of traveling routes. Here, the detailed information may include an arrival time, a moving distance, traffic information, etc.

When any one of the plurality of traveling routes is selected by the input device 151, the processor 141 may control the display device 152 to display traveling route information on the selected traveling route.

The processor 141 may control travel based on the navigation information during the execution of the autonomous driving mode and control the vehicle to travel at the target traveling speed based on the acquired traveling speed information and target traveling speed information. Here, the target traveling speed information may be preset traveling speed information and may be the target traveling speed information input by a user.

The acquisition of the traveling speed information of the vehicle may include acquiring the traveling speed of the vehicle based on the detection information output from the plurality of wheel speed sensors.

The acquisition of the traveling speed information of the vehicle may include acquiring the traveling speed of the vehicle based on the detection information output from the acceleration sensor.

The acquisition of the traveling speed information of the vehicle may include acquiring the traveling speed of the vehicle based on the detection information output from the plurality of wheel speed sensors and the detection information output from the acceleration sensor.

The processor 141 may recognize obstacles positioned at the front and left and right sides of the vehicle 1 based on the image information of the camera 110, the forward radar information of the front radar 120, and the corner radar information of the corner radars 130 and acquire the speed information, the position information, and the type information (e.g., whether an obstacle is another vehicle, a pedestrian, a cyclist, a curb, a guardrail, a tree, or a streetlight) of the recognized obstacles.

The position information of the obstacles may include information on relative distances with the vehicle 1 and information on relative directions with the vehicle 1, and the speed information may include relative speeds with the vehicle 1.

The processor 141 may predict movements of the obstacles around the vehicle 1 based on the speed information, the position information, and the type information of the recognized obstacles.

Nearby obstacles may include another vehicle that travels in the same lane as the vehicle 1 and travels in front of the vehicle 1, another vehicle that travels in a lane to the left of that of the vehicle 1, and another vehicle that travels in a lane to the right of that of the vehicle 1.

The nearby obstacles may be obstacles positioned adjacent to a following lane line.

The processor 141 may recognize a lane line of the road by performing image processing upon receiving the image information of the road during the execution of the autonomous driving mode, recognize a lane in which the vehicle 1 travels and nearby lanes based on position information of the recognized lane line, generate the following lane line based on lane information and route information on the recognized lane of the host vehicle, and control autonomous driving based on position information and obstacle information of the generated following lane line.

The obstacle information may include position information and speed information of the obstacle, and the position information of the obstacle may include distance information and direction information of the obstacle.

The following lane line is a line in which the center of a body of a vehicle follows any one position of a lane. Here, any one position of the lane may be any one of two lane lines constituting the lane or a central position of the two lane lines.

(2) The processor 141 for controlling autonomous driving during travel of an emergency vehicle will be described.

The processor 141 may determine whether an emergency vehicle 2 travels in real time during the execution of the autonomous driving mode, and when it is determined that the emergency vehicle 2 travels, request position information and traveling route information of the emergency vehicle 2 from the emergency vehicle 2 or a server.

The processor 141 may determine whether the emergency vehicle 2 is present at a position adjacent to the vehicle 1 based on position information of the vehicle 1 and the position information of the emergency vehicle 2, and when it is determined that the emergency vehicle 2 is present at the position adjacent to the vehicle 1, control the display device 152 to display information on the adjacency of the emergency vehicle 2.

Here, the determination of whether the emergency vehicle 2 is adjacent to the vehicle 1 may include determining that the emergency vehicle 2 is adjacent to the vehicle 1 when a distance between the emergency vehicle 2 and the vehicle 1 is smaller than or equal to a preset distance.

Upon receiving the position information and the traveling route information from the emergency vehicle 2, the processor 141 may determine whether the emergency vehicle 2 is positioned in front of the vehicle 1 or positioned behind the vehicle 1 on the same route based on the traveling route of the vehicle 1, the position information of the vehicle 1, the traveling route of the emergency vehicle 2, and the position information of the emergency vehicle 2.

When it is determined that the emergency vehicle 2 is positioned in front of the vehicle 1, the processor 141 may control autonomous driving based on the traveling route information from the current position of the vehicle 1 to the destination and control the display device 152 to display the position information of the emergency vehicle 2 on the map information.

In a case that the traveling route information of the vehicle 1 is changed by the travel of the emergency vehicle 2, when it is determined the emergency vehicle 2 is positioned in front of the vehicle 1, the processor 141 may re-generate a traveling route from the current position to the destination and control the autonomous driving based on the re-generated traveling route.

When it is determined that the emergency vehicle 2 is positioned behind the vehicle 1, the processor 141 may acquire a target point based on the traveling lane of the vehicle 1, the traveling lane of the emergency vehicle 2, and obstacle information and control the autonomous driving based on the acquired target point.

This will be described in more detail.

Upon receiving the traveling route from the emergency vehicle 2 or the server, the processor 141 compares the traveling route of the emergency vehicle 2 with the traveling route of the vehicle 1.

When determining whether the emergency vehicle 2 travels, the processor 141 may determine whether emergency traveling information is received from the server or the emergency vehicle 2, determine that the emergency vehicle travels when it is determined that the emergency traveling information has been received, and determine that the emergency vehicle does not travel when it is determined that the emergency traveling information has not been received.

The processor 141 may determine whether the traveling route of the vehicle 1 needs to be changed when it is determined that some or all of the traveling route of the emergency vehicle 2 and the traveling route of the vehicle 1 are matched, and generate an avoidance route when it is determined that the traveling route of the vehicle 1 needs to be changed.

When it is determined that some or all of the traveling route of the emergency vehicle 2 and the traveling route of the vehicle 1 are matched, the processor 141 may acquire position information and road environment information of the matched route (hereinafter referred to as "the same traveling route").

The processor 141 may receive the road environment information of the same traveling route from the server after requesting the road environment information corresponding to the position information of the same traveling route from the server and acquire the road environment information of the same traveling route from the map information stored in the memory.

Figure 5A:
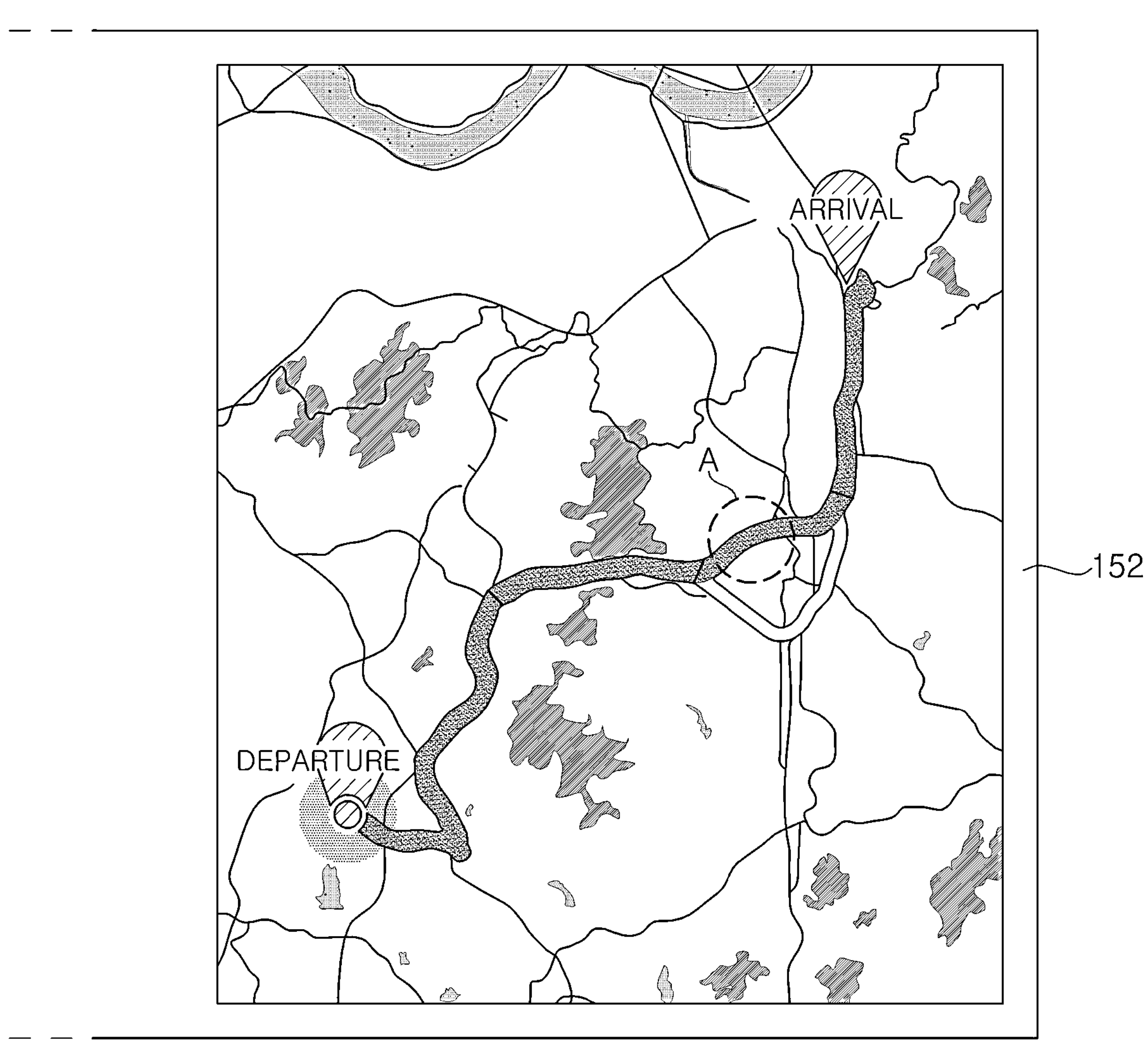
FIGS. 5A and 5B are exemplary views of a traveling route of the vehicle according to the embodiment.

As illustrated in FIG. 5A, the processor 141 may control the display device 152 to display the same traveling route A.

The processor 141 may control the display device 152 to display the same traveling route among the traveling routes of the vehicle 1 differently from the remaining traveling routes.

Figure 5B:

As illustrated in FIG. 5B, the processor 141 determines whether the avoidance route is present based on the acquired position information and road environment information of the same traveling route, generates a final route including the avoidance route when it is determined that the avoidance route is present, and controls the autonomous driving based on the generated final route.

The processor 141 may determine whether the avoidance route is present based on the acquired position information of the same traveling route and the current position information and the destination information of the vehicle.

When it is determined that the current position is a point adjacent to the avoidance route (e.g., an entry point of the avoidance route), the processor 141 acquires a target point within the avoidance route based on the road environment information of the avoidance route and controls steering and a traveling speed based on the acquired target point.

The road environment information may include road type information, road obstacle information, road traffic information, lane information, etc.

The target point may be a traveling lane in which the vehicle will travel.

Figure 6:
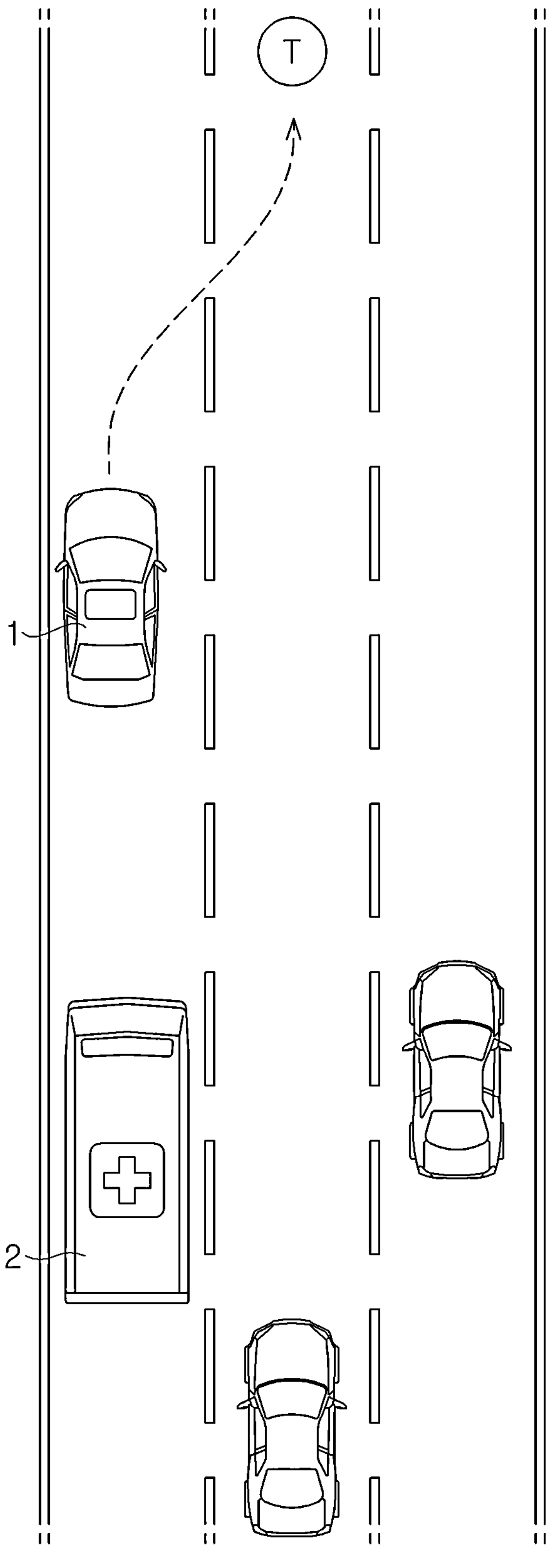
FIG. 6 is an exemplary view of changing a traveling lane of the vehicle according to the embodiment.

As illustrated in FIG. 6, the processor 141 may generate a following lane line F based on current traveling lane information and a target point T of the vehicle 1 and control autonomous driving based on the generated following lane line F.

When it is determined that the avoidance route is not present and the current position of the vehicle is the entry point of the same traveling route, the processor 141 acquires the target point based on current traveling lane information of the emergency vehicle 2, the current traveling lane information of the vehicle 1, and obstacle information, generates the following lane line based on the acquired target point, controls the autonomous driving based on the generated following lane line, and controls the steering and the traveling speed.

The control of the steering may include transmitting the steering signal to the steering system 42, and the control of the traveling speed may include transmitting the acceleration signal or the deceleration signal to the engine system 12 and transmitting at least one of the deceleration signal or the braking signal to the braking system 32.

The processor 141 may control the display device 152 to display at least one of the remaining traveling time or the remaining distance to the entry point of the same traveling route.

The processor 141 for controlling the autonomous driving during travel of the emergency vehicle may be implemented as a single processor.

Figure 7:
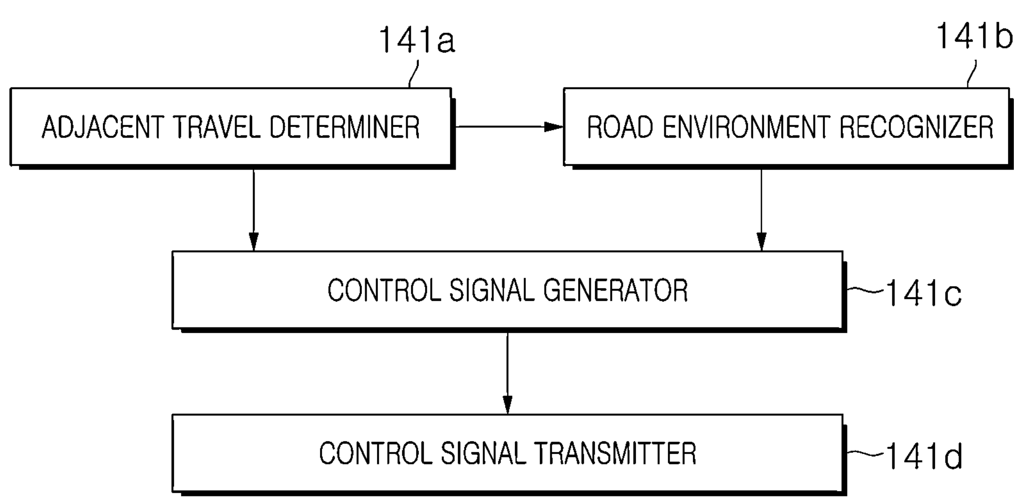
FIG. 7 is a detailed configuration diagram of a processor of the vehicle according to the embodiment.

As illustrated in FIG. 7, the processor 141 for controlling the autonomous driving during travel of the emergency vehicle may also be implemented as a plurality of processors.

The processor 141 for controlling the autonomous driving during travel of the emergency vehicle may include processors for determining adjacent travel of the emergency vehicle, recognizing the road environment, acquiring the target point, and transmitting the control signals for the autonomous driving.

That is, the processor 141 may include an adjacent travel determiner 141*a*, a road environment recognizer 141*b*, a control signal generator 141*c*, and a control signal transmitter 141*d*.

The adjacent travel determiner 141*a* may receive the image information from the camera 110, receive the radar information from the front radar 120 and the corner radars 130, receive sound information from the sound collector 170, and receive the position information and the route information of the emergency vehicle through the communicator 143. Here, the camera 110 may be a rear camera. The sound information may be information on sounds generated around the vehicle 1.

The adjacent travel determiner 141*a* may determine whether the emergency vehicle has been positioned adjacent to the vehicle based on at least one of the image information, the radar information, the sound information, or the position information and the route information of the emergency vehicle.

More specifically, the adjacent travel determiner 141*a* may primarily determine whether the emergency vehicle has been adjacent to the vehicle based on the sound information, and the position information and the route information of the emergency vehicle.

The adjacent travel determiner 141*a* may analyze a frequency pattern of the sound based on the sound information collected by the sound collector and when it is determined that the collected sound is a sound having a siren sound frequency pattern based on the analyzed result, determine that the emergency vehicle has been adjacent to the vehicle.

The adjacent travel determiner 141*a* may determine a distance between the emergency vehicle and the vehicle based on the position information and the route information of the emergency vehicle received through the communicator 143, and when the determined distance is smaller than the preset distance, determine that the emergency vehicle has been adjacent to the vehicle.

The adjacent travel determiner 141*a* may secondarily determine whether the emergency vehicle has been adjacent to the vehicle based on the image information and the radar information.

When it is determined that an object of the emergency vehicle is present in the image based on the image information acquired by the camera 110, the adjacent travel determiner 141*a* may determine that the emergency vehicle has been adjacent to the vehicle.

When it is determined that the object of the emergency vehicle is present in the image, the adjacent travel determiner 141*a* may determine the distance between the vehicle and the emergency vehicle based on the radar information and when the determined distance is smaller than the preset distance, determine that the emergency vehicle has been adjacent to the vehicle.

When it is determined that the emergency vehicle has been adjacent to the vehicle, the adjacent travel determiner 141*a* may acquire information on the relative position of the emergency vehicle at which the emergency vehicle is positioned with respect to the vehicle based on the image information and determine information on the distance between the vehicle and the emergency and traveling speed information of the emergency vehicle based on the acquired relative position information of the emergency vehicle and the radar information.

When it is determined that the emergency vehicle has been adjacent to the vehicle, the adjacent travel determiner 141*a* may periodically acquire the information on the relative position of the emergency vehicle at which the emergency vehicle is positioned with respect to the vehicle based on the image information and also acquire the traveling speed information of the emergency vehicle based on a change in the periodically acquired relative position information of the emergency vehicle.

The adjacent travel determiner 141*a* may check a first reliability corresponding to determining whether the emergency vehicle has been adjacent to the vehicle based on the sound information, a second reliability corresponding to determining whether the emergency vehicle has been adjacent to the vehicle based on the communication information of the emergency vehicle, a third reliability corresponding to determining whether the emergency vehicle has been adjacent to the vehicle based on the image information, and a fourth reliability corresponding to determining whether the emergency vehicle has been adjacent to the vehicle based on the radar information and finally determine whether the emergency vehicle has been adjacent to the vehicle based on the checked first, second, third, and fourth reliabilities.

For example, the first reliability may correspond to a matching rate between the frequency pattern and the siren sound frequency pattern of the collected sound.

The second reliability and the fourth reliability may correspond to the distance between the vehicle and the emergency vehicle.

The third reliability may correspond to a matching rate between an object in the image information and an object of the emergency vehicle.

The adjacent travel determiner 141*a* may check a first weight corresponding to combining the first reliability with the third reliability, a second weight corresponding to combining the first reliability with the fourth reliability, a third weight corresponding to combining the second reliability with the third reliability, and a fourth weight corresponding to combining the second reliability with the fourth reliability and finally determine whether the emergency vehicle has been adjacent to the vehicle based on the checked first, second, third, and fourth weights.

The road environment recognizer 141*b* may receive the distance information of the emergency vehicle and the traveling speed information of the emergency vehicle from the adjacent travel determiner 141*a*.

When it is finally determined that the emergency vehicle has been adjacent to the vehicle, the road environment recognizer 141*b* may acquire the traveling speed information of the emergency vehicle from the distance information of the emergency vehicle and also receive the traveling speed information of the emergency vehicle through the communicator 143.

When it is determined that the emergency vehicle has been adjacent to the vehicle, the road environment recognizer 141*b* recognizes lane position information of the road on which the vehicle 1 currently travels and recognizes position information of the lane in which the emergency vehicle travels.

The road environment recognizer 141*b* acquires information on a lane to be changed based on the lane position information of the vehicle, the lane position information of the emergency vehicle, and the obstacle information. Here, the lane to be changed to may be the target point.

More specifically, the road environment recognizer 141*b* may acquire the information on the road on which the vehicle travels based on the current position information of the vehicle and the map information received by the position receiver and check the number of lanes based on the acquired road information.

When receiving the road image information based on the image information, the road environment recognizer 141*b* may recognize lane lines of the road by performing image processing and acquire the number of lanes based on position information of the recognized lane lines.

The road environment recognizer 141*b* may also recognize position information of the traveling lane of the vehicle based on the image information.

The road environment recognizer 141*b* may recognize obstacles around the vehicle based on the image information and the radar information.

The road environment recognizer 141*b* may acquire the position information of a lane to be changed based on the position information of the traveling lane of the emergency vehicle, the acquired number of lanes, the recognized position information of the traveling lane of the vehicle, and the recognized obstacle information.

More specifically, the road environment recognizer 141*b* recognizes obstacles based on at least one of the image information or the radar information, recognizes obstacles present in a left-right direction of the vehicle 1 among the recognized obstacles, acquires distance information of the obstacles present in the left-right direction of the vehicle 1, and acquires traveling speed information of the obstacles based on the acquired distance information of the obstacles.

The road environment recognizer 141*b* may acquire the position information of a lane to be changed based on the lane position information of the emergency vehicle 2, the distance information of the emergency vehicle 2, the traveling speed information of the emergency vehicle 2, the traveling speed information of the vehicle 1, the traveling lane position information of the vehicle 1, the number of lanes on the road, and the acquired distance information and traveling speed information of the obstacles.

The road environment recognizer 141*b* may acquire a lane that is the farthest distance from the emergency vehicle in a range in which collision with nearby vehicles does not occur as the changed lane.

The control signal generator 141*c* may generate a steering signal, an acceleration signal, a deceleration signal, and a braking signal for autonomous driving to the changed lane based on the traveling lane position information and the position information of the changed lane of the vehicle 1.

The control signal generator 141*c* may determine whether the vehicle 1 may stop in the changed lane based on the road information, the obstacle information, and the position information of the changed lane, set a point at which the vehicle 1 has traveled at a constant speed for a preset time from an entry point of the changed lane to a stop point when it is determined that the vehicle 1 may stop in the changed lane, generate the steering signal and a traveling speed control signal so that the vehicle 1 autonomously travels from the traveling lane to the stop point of the vehicle, and generate the braking signal when it is determined that a current position of the vehicle is the entry point of the changed lane based on position information of a position receiver.

The control signal generator 141*c* may set a target traveling speed based on the road type information when it is determined that the vehicle may not stop in the changed lane, generate the steering signal and the traveling speed control signal so that the vehicle autonomously travels from the traveling lane of the vehicle to the entry point of the changed lane, and when it is determined that the current position of the vehicle is the entry point of the changed lane based on the position information of the position receiver, generate the deceleration signal for the vehicle to travel the set target traveling speed. The traveling at the target traveling speed may include constant speed traveling.

For example, when the type of the road is a local road, the target traveling speed may be set to about 30 kph, and when the type of the road is a highway, the target traveling speed may be set to about 70 kph.

When the vehicle autonomously travels to the entry point of the changed lane, the control signal generator 141*c* may generate the traveling speed control signal based on the traveling speed information of the vehicle, the distance information of the obstacles, and the traveling speed information of the obstacles.

The control signal generator 141*c* may transmit the steering signal, the acceleration signal, the deceleration signal, and the braking signal to the control signal transmitter 141*d*.

The control signal transmitter 141*d* may receive at least one of the steering signal, the acceleration signal, the deceleration signal, or the braking signal from the control signal generator 141*c*.

The control signal transmitter 141*d* may acquire target steering angle information corresponding to the received steering signal upon receiving the steering signal and transmit the acquired target steering angle information to the steering system.

The control signal transmitter 141*d* may acquire a target braking torque corresponding to the received braking signal upon receiving the braking signal and transmit the acquired target braking torque to the braking system.

The control signal transmitter 141*d* may acquire a target engine torque corresponding to the received acceleration signal upon receiving the acceleration signal and transmit the acquired target engine torque to the engine system 12.

The control signal transmitter 141*d* may acquire a target engine torque corresponding to the received deceleration signal upon receiving the deceleration signal and transmit the acquired target engine torque to the engine system 12. In this case, the engine system may stop power generation to reduce the traveling speed of the vehicle.

The control signal transmitter 141*d* may acquire a target braking torque corresponding to the received deceleration signal upon receiving the deceleration signal and transmit the acquired target braking torque to the braking system 32. In this case, the braking system may generate a braking force corresponding to the target braking torque.

Meanwhile, each component illustrated in FIGS. 4 and 7 is a software and/or hardware component such as a field programmable gate array (FPGA) or an application specific integrated circuit (ASIC).

The processor 141 may be implemented as a processor (not illustrated) for performing the above-described operations using the data stored in a memory (not illustrated) for storing data on an algorithm for controlling the operations of the components in the DAS or a program reproducing the algorithm. In this case, each of the memory and the processor may be implemented as a separate chip. Alternatively, the memory and the processor may also be implemented as a single chip.

The processor 141 may be implemented as a processor (not illustrated) for performing the above-described operations using the data stored in a memory (not illustrated) for storing data on an algorithm for controlling the operations of the components in the vehicle or a program reproducing the algorithm. In this case, each of the memory and the processor may be implemented as a separate chip. Alternatively, the memory and the processor may also be implemented as a single chip.

The memory 142 may store the map information.

The memory 142 may store the information on the target traveling speed. Here, the target traveling speed is a preset traveling speed and may be a traveling speed set in manufacture of a vehicle or a traveling speed set by a user.

The memory 142 may store an application for executing an emergency mode. This application may be pre-stored or may be an application downloaded from a server.

The memory 142 may store a program and/or data for the processor 141 to process the image data, a program and/or data for the processor 141 to process the radar data, and a program and/or data for the processor 141 to generate the acceleration signal, the braking signal, and/or the steering signal.

The memory 142 may temporarily store the image data received from the camera 110 and/or the radar data received from the radars 120 and 130 and temporarily store the processing result of the image data and/or the radar data of the processor 141.

The memory 142 may be implemented as at least one of nonvolatile memory devices such as a cache, a read only memory (ROM), a programmable ROM (PROM), an erasable programmable ROM (EPROM), an electrically erasable programmable ROM (EEPROM), and a flash memory, volatile memory devices such as a random access memory (RAM), or storage media such as a hard disk drive (HDD) and a CD-ROM, but is not limited thereto.

The emergency vehicle 2 may recognize an emergency mode execution instruction when the emergency vehicle starts and recognize an emergency mode end instruction when the emergency vehicle is turned off.

The emergency vehicle 2 checks the current position upon receiving a user's emergency mode instruction, retrieves the route from the current position to the destination upon receiving the destination information, displays the route information on the retrieved route through the display device, and transmits the route information to general vehicles.

The emergency vehicle may retrieve the route from the current position to the destination based on road environment information, weather information, and traffic environment information upon receiving the destination information.

The emergency vehicle may receive the road environment information, the weather information, and the traffic environment information from a server.

The emergency vehicle may transmit the route information of the emergency vehicle to the general vehicles and the server.

The emergency vehicle controls operations of a warning sound and a warning lamp upon receiving the user's emergency mode instruction.

As is apparent from the above description, according to the present disclosure, it is possible to easily recognize a position and a travel direction of an emergency vehicle, such as a U-turn or a left turn, by acquiring route information of the emergency vehicle during autonomous driving, thereby allowing a vehicle to actively yield a traveling lane to the emergency vehicle.

According to the present disclosure, it is possible to allow an emergency vehicle such as a fire truck, an ambulance, a blood supply vehicle, or a police car to secure road space, that is, a traveling lane for a quick movement of the emergency vehicle upon emergency dispatch under the Road Traffic Act. Therefore, according to the present disclosure, it is possible to allow the emergency vehicle to arrive at a destination from an accident point within a desired time.

When the emergency vehicle is an ambulance, according to the present disclosure, it is possible to allow the emergency vehicle to quickly transport a patient, thereby helping to realize social justice. That is, it is possible to expect an increase in a lifesaving survival rate according to the dispatch of the emergency vehicle.

According to the present disclosure, by guiding a host vehicle to an avoidance lane according to nearby obstacle information in a traveling situation of the emergency vehicle, it is possible to secure traveling stability for general vehicles.

According to the present disclosure, it is possible to change a traveling lane based on movement information of an obstacle, thereby quickly and accurately coping with various situations.

According to the present disclosure, it is possible to improve the performance and stability of an autonomous driving mode and secure the safety of a DAS.

According to the present disclosure, it is possible to quickly and safely avoid another vehicle and an emergency vehicle near a host vehicle in a state in which no hardware component is added, thereby preventing an increase in the cost of the host vehicle and increasing the utilization of the DAS.

As described above, according to the present disclosure, it is possible to improve the quality and marketability of the DAS and the vehicle having the DAS, increase user satisfaction, and secure the competitiveness of a product.

Meanwhile, disclosed embodiments may be implemented in the form of a recording medium in which instructions executable by a computer are stored. The instructions may be stored in the form of a program code, and when executed by a processor, program modules are generated to perform operations of the disclosed embodiments. The recording medium may be implemented as a computer-readable recording medium.

The computer-readable recording medium includes any type of recording medium in which instructions that can be decoded by a computer are stored. For example, there may be a ROM, a RAM, a magnetic tape, a magnetic disk, a flash memory, an optical data storage device, etc.

The disclosed embodiments have been described above with reference to the accompanying drawings. Those skilled in the art to which the present disclosure pertains will understand that the present disclosure can be carried out in a form different from those of the disclosed embodiments without changing the technical spirit or essential features of the present disclosure. The disclosed embodiments are illustrative and should not be construed as limiting.

What is claimed is:

1. An apparatus for driver assistance provided in a vehicle, the apparatus comprising:

a camera module; a radar module; and a processor configured to:

determine whether a traveling route of the vehicle needs to be changed based on received traveling route information of an emergency vehicle and traveling route information of the vehicle upon receiving the traveling route information of the emergency vehicle through a communicator of the vehicle during autonomous driving;

determine whether a same route, where traveling route of the emergency vehicle is overlapped with traveling routes of the vehicle, is present based on the received traveling route information of the emergency vehicle and the traveling route information of the vehicle, and control the autonomous driving along a traveling route changed based on at least one of output data of the camera module or output data of the radar module when it is determined that the traveling route of the vehicle needs to be changed, wherein the processor is configured to acquire position information of a lane to be changed based on an acquired road information, the position information of a traveling lane of the vehicle, the position information of traveling lane of the emergency vehicle, and obstacle information acquired by the radar module when it is determined that the traveling lane of the vehicle needs to be changed, and control steering and traveling speed to move to an acquired changed lane, and wherein the processor is further configured to determine whether the vehicle is to stop in the changed lane based on the road information, the obstacle information, and the position information of the changed lane when the vehicle moves to the acquired changed lane, set a point at which the vehicle has traveled at a constant speed for a preset time from an entry point of the changed lane to a stop point when it is determined that the vehicle is to stop in the changed lane, control the steering and the traveling speed from the traveling lane to the stop point of the vehicle, and control braking when it is determined that a current position of the vehicle is the entry point of the changed lane based on position information of a position receiver.

2. The apparatus of claim 1, wherein the processor is configured to:

determine whether an avoidance route is present based on current position information, destination information of the vehicle and the same route when it is determined that the same route is present.

3. The apparatus of claim 1, wherein the processor is configured to:

determine whether the emergency vehicle is adjacent to the vehicle based on position information of the emergency vehicle and position information of the vehicle upon receiving the position information of the emergency vehicle, and control the vehicle to change a traveling lane when it is determined that the emergency vehicle is adjacent to the vehicle.

4. The apparatus of claim 3, wherein the processor is configured to:

analyze a frequency pattern of a sound collected by a sound collector of the vehicle; and determine that the emergency vehicle is adjacent to the vehicle when it is determined that the collected sound is a sound having a siren sound frequency pattern based on the analysis.

5. The apparatus of claim 1, wherein the processor is configured to:

determine whether the emergency vehicle is adjacent to the vehicle based on at least one of position information of the emergency vehicle received through the communicator or a sound collected by a sound collector of the vehicle;

determine whether the emergency vehicle is adjacent to the vehicle based on image information acquired by the camera module when it is determined that the emergency vehicle is adjacent to the vehicle;

acquire distance information and traveling speed information of the emergency vehicle based on the image information acquired by the camera module when it is determined that the emergency vehicle is adjacent to the vehicle; and control at least one of steering or a traveling speed based on the distance information, the traveling speed information of the emergency vehicle and traveling speed information of the vehicle.

6. The apparatus of claim 1, wherein the processor is configured to:

determine whether the emergency vehicle is adjacent to the vehicle based on at least one of position information of the emergency vehicle received through the communicator or a sound collected by a sound collector of the vehicle;

determine whether the emergency vehicle is adjacent to the vehicle based on radar information of the radar module when it is determined that the emergency vehicle is adjacent to the vehicle;

acquire distance information and traveling speed information of the emergency vehicle based on the radar information acquired by the radar module when it is determined that the emergency vehicle is adjacent to the vehicle; and control at least one of steering or a traveling speed based on the distance information, the traveling speed information of the emergency vehicle and traveling speed information of the vehicle.

7. The apparatus of claim 1, wherein the processor is configured to:

determine whether the emergency vehicle is adjacent to the vehicle based on at least one of position information of the emergency vehicle received through the communicator or a sound collected by a sound collector of the vehicle;

determine whether an object of the emergency vehicle is present in an image of image information acquired by the camera module when it is determined that the emergency vehicle is adjacent to the vehicle;

acquire distance information and traveling speed information of the emergency vehicle based on radar information of the radar module when it is determined that the object of the emergency vehicle is present in the image; and control at least one of steering or a traveling speed based on the distance information, the traveling speed information of the emergency vehicle and traveling speed information of the vehicle.

8. The apparatus of claim 7, wherein the processor is configured to:

acquire position information of the traveling lane in which the vehicle travels and position information of a traveling lane of the emergency vehicle based on the image information acquired by the camera module;

acquire road information based on pre-stored map information and the position information of the vehicle; and determine whether the traveling lane of the vehicle needs to be changed based on the acquired road information, position information of the traveling lane of the vehicle, and position information of the traveling lane of the emergency vehicle.

9. The apparatus of claim 1, wherein the processor is configured to:

control the steering and the traveling speed from the traveling lane to the stop point of the vehicle when it is determined that the vehicle is not to stop in the changed lane;

acquire a target traveling speed corresponding to the road information when it is determined that the current position of the vehicle is the entry point of the changed lane based on the position information of the position receiver; and control travel at the acquired target traveling speed.

10. A method of controlling an apparatus for driver assistance including a camera module and a radar module, the method comprising:

determining whether an emergency vehicle is adjacent to a vehicle based on at least one of position information of the emergency vehicle received through a communicator of the vehicle or a sound collected by a sound collector of the vehicle during autonomous driving;

determining whether the emergency vehicle is adjacent to the vehicle based on at least one of image information acquired by the camera module or radar information acquired by the radar module when it is determined that the emergency vehicle is adjacent to the vehicle;

determining whether a same route, where traveling route of the emergency vehicle is overlapped with traveling routes of the vehicle, is present based on the received traveling route information of the emergency vehicle and the traveling route information of the vehicle; and controlling the vehicle to change a traveling lane when it is determined that the emergency vehicle is adjacent to the vehicle, wherein the method further comprises acquiring position information of a lane to be changed based on an acquired road information, the position information of a traveling lane of the vehicle, the position information of traveling lane of the emergency vehicle, and obstacle information acquired by the radar module when it is determined that the traveling lane of the vehicle needs to be changed, and controlling steering and traveling speed to move to an acquired changed lane, and wherein the method further comprises determining whether the vehicle is to stop in the changed lane based on the road information, the obstacle information, and the position information of the changed lane when the vehicle moves to the changed lane, setting a point at which the vehicle has traveled at a constant speed for a preset time from an entry point of the changed lane to a stop point when it is determined that the vehicle is to stop in the changed lane, controlling the steering and the traveling speed from the traveling lane to the stop point of the vehicle; and controlling braking when it is determined that a current position of the vehicle is the entry point of the changed lane based on position information of a position receiver.

11. The method of claim 10, further comprising:

determining whether an avoidance route is present based on current position information, destination information of the vehicle and the same route when it is determined that the same route is present; and controlling autonomous driving based on the avoidance route when it is determined that the avoidance route is present.

12. The method of claim 10, further comprising:

analyzing a frequency pattern of the sound collected by the sound collector; and determining that the emergency vehicle is adjacent to the vehicle when it is determined that the collected sound is a sound having a siren sound frequency pattern based on the analysis.

13. The method of claim 10, further comprising:

acquiring distance information and traveling speed information of the emergency vehicle based on the image information acquired by the camera module when it is determined that the emergency vehicle is adjacent to the vehicle; and controlling at least one of steering or a traveling speed based on the distance information, the traveling speed information of the emergency vehicle and traveling speed information of the vehicle.

14. The method of claim 10, further comprising:

acquiring distance information and traveling speed information of the emergency vehicle based on the radar information acquired by the radar module when it is determined that the emergency vehicle is adjacent to the vehicle; and controlling at least one of steering or a traveling speed based on the distance information, the traveling speed information of the emergency vehicle and traveling speed information of the vehicle.

15. The method of claim 10, further comprising:

acquiring position information of the traveling lane in which the vehicle travels and position information of a traveling lane of the emergency vehicle based on the image information acquired by the camera module;

acquiring road information based on pre-stored map information and the position information of the vehicle; and determining whether the traveling lane of the vehicle needs to be changed based on the acquired road information, position information of the traveling lane of the vehicle, and position information of the traveling lane of the emergency vehicle.

16. The method of claim 10, further comprising:

controlling the steering and the traveling speed from the traveling lane to the stop point of the vehicle when it is determined that the vehicle is not to stop in the changed lane;

acquiring a target traveling speed corresponding to the road information when it is determined that the current position of the vehicle is the entry point of the changed lane based on the position information of the position receiver; and controlling travel at the acquired target traveling speed.

* * * * *